US009390272B2

(12) United States Patent  (10) Patent No.: US 9,390,272 B2
Barnes et al.  (45) Date of Patent: Jul. 12, 2016

(54) SYSTEMS AND METHODS FOR MONITORING AND MITIGATING INFORMATION LEAKS

(71) Applicant: Raytheon BBN Technologies Corp., Cambridge, MA (US)

(72) Inventors: Richard Lee Barnes, McLean, VA (US); John-Francis Mergen, Baltimore, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 348 days.

(21) Appl. No.: 13/934,658

(22) Filed: Jul. 3, 2013

(65) Prior Publication Data

US 2013/0298256 A1  Nov. 7, 2013

Related U.S. Application Data

(62) Division of application No. 13/084,476, filed on Apr. 14, 2011, now abandoned.

(60) Provisional application No. 61/425,353, filed on Dec. 21, 2010.

(51) Int. Cl.
*G06F 21/60* (2013.01)
*H04L 29/06* (2006.01)

(52) U.S. Cl.
CPC .............. *G06F 21/60* (2013.01); *H04L 63/04* (2013.01); *H04L 63/1433* (2013.01)

(58) Field of Classification Search
CPC ...... G06F 21/60; H04L 63/04; H04L 63/1433
See application file for complete search history.

(56) References Cited

U.S. PATENT DOCUMENTS

| | | | |
|---|---|---|---|
| 2002/0021665 A1 | 2/2002 | Bhagavath et al. | |
| 2002/0164075 A1* | 11/2002 | Acharya | G06F 17/30256 382/190 |
| 2007/0294762 A1* | 12/2007 | Shraim | H04L 12/585 726/22 |
| 2008/0147659 A1* | 6/2008 | Chen | G06F 17/30867 |

(Continued)

OTHER PUBLICATIONS

NPL: Viejo et al., "Using social networks to distort users' profiles generated by web search engines," Computer Networks Journal, Jun. 2010.*

(Continued)

*Primary Examiner* — Wing F Chan
*Assistant Examiner* — Padma Mundur
(74) *Attorney, Agent, or Firm* — Ropes & Gray LLP

(57) ABSTRACT

Systems and methods are disclosed for determining whether a third party observer could determine that an organization has an intent with respect to subject matter based on the organization's web activity. The determination that there is a risk of information leaks to the third party observer can be completed by analyzing the entropy of web usage information destined for the third party observer's servers. Systems and methods are also disclosed for mitigating the risk of information leaks by obscuring the organization's web activity. The web activity can be obscured by selecting candidate actions that can be used to generate neutralizing web traffic from the organization's network which will obscure an intent with respect to a particular subject matter. For example, the candidate actions can identify specific queries, links, or actions that the organization can take to neutralize their web activity to a less remarkable point in the search space.

17 Claims, 5 Drawing Sheets

(56) References Cited

U.S. PATENT DOCUMENTS

| | | | |
|---|---|---|---|
| 2008/0301090 A1* | 12/2008 | Sadagopan | G06F 17/30867 |
| 2009/0132953 A1 | 5/2009 | Reed, Jr. et al. | |
| 2010/0094612 A1* | 4/2010 | Weerasinghe | H04L 12/5885 703/23 |
| 2010/0106703 A1 | 4/2010 | Cramer | |

OTHER PUBLICATIONS

Gündüz et al., "A Web Page Prediction Model Based on Click-Stream Tree Representation of User Behaviour," SIGKDD Conference, pp. 535-540 (Aug. 2003).

* cited by examiner

SYSTEMS AND METHODS FOR MONITORING AND MITIGATING INFORMATION LEAKS

CROSS-REFERENCE TO RELATED APPLICATIONS

This is a divisional application of U.S. patent application Ser. No. 13/084,476, filed Apr. 11, 2011, which claims priority benefit under 35 U.S.C. §119(e) from U.S. provisional application No. 61/425,353, filed on Dec. 21, 2010. The aforementioned, earlier-filed application is hereby incorporated by reference herein in its entirety.

BACKGROUND OF THE DISCLOSURE

This application relates to monitoring and mitigating information leaks that can occur through data mining by third party observers.

A major concern for many organizations is the leakage of information through employee use of the web. The leakage of information can occur through inadvertent actions of the employee as well as direct exfiltration of data. Through the use of search tools, web site monitoring, and other common commercial data analytical tools, a third party can derive substantial insights into the operation and planning of a large corporation.

Many Internet applications today use Data Analytical Services (DAS) to amass information about their users. Typically an application contracts with a DAS provider, so that the application provides raw data to the DAS provider and the DAS provider returns analytics to the application. The DAS use a number of methods to collected information on users' visit behavior. The types of information tracked include such factors as geolocation, dwell time on a particular web page, incoming and outgoing clicks (e.g., launch points), the type of computer used, the telecommunications provider used, as well as a number of other parameters—including tens to hundreds of data elements overall. This information is used to track and identify users, to make inferences about their preferences and habits, and to create the associations about their behaviors that are of value to commercial organizations. For example, a commercial website might use information about how long a user dwells on a set of product pages along with information on the user's geolocation to infer that a user has an interest in a particular class of product and belongs to a particular income class. The website can then use this information to improve its marketing to the user, not just to determine what class of products might interest a user, but also to present more exclusive product offerings within that class to more affluent users or more bargain-priced offerings to less affluent users. An example of this understanding is Amazon's ability to predict "what others like you" are interested in and Netflix's ability to correctly recommend movies. In both cases, the data mining systems develop complete models of needs, desires, and predictions of intent of the users. AMAZON is a registered trademark owned by Amazon, Inc. NETFLIX is a registered trademark owned by Netflix, Inc.

While the collected information has commercial value to DAS providers and applications, it can present a threat to individuals and organizations by revealing information that these entities do not wish to reveal. For users, this can mean that they may be revealing sensitive information about themselves, such as their identity or whereabouts, even when providing apparently innocuous information. This risk is particularly acute given that DAS providers aggregate information across multiple applications or web sites.

For organizations, there is the additional risk that the collective behavior of members of the organization (e.g., a group of users all visiting sites related to the same topic) could reveal sensitive information about the organization, such as product plans or future large scale business transactions. For example, when an organization is involved in particular subject matter or is investigating the subject matter for possible involvement, the web usage (e.g., searching and web browsing history) of the organization tends to exhibit an increased concentration around the subject matter in which the organization is involved in comparison to an uninterested or neutral organization. For example, if company A is secretly investigating company B for a possible acquisition, company A's web usage will likely tend to involve company B more than would otherwise be expected. A third party observer who is tracking the users in company A, such as a DAS, will likely have enough information about company A's web usage to discern company A's increased interest in Company B. If the observer knew that company A were, for example, an investment bank, the observer might be able to translate knowledge of company A's increased interest into its true intent regarding company B. The third party observer could then use the knowledge of the company A's intent for nefarious actions, such as, publicizing information about company A's secret investigations into company B to affect their stock prices for unjust profit or by placing certain investments in Company A or B that take advantage of the information.

In order to help users mitigate these risks, some tools have been developed to provide information about tracking and information being gathered about individual users, which function as tools on standalone computers. Other tools operate as a combination of a probe machine and user machine. A key element of these systems is that they are implemented locally on a user's device and do not make use of any network resources. While these systems can be very effective for sophisticated end users who run these applications on their PCs, they have several limitations. For example, (1) they require the installation of software on individual PCs, with requires either active configuration by the end users or the inclusion of the software in a corporate configuration management system with associated support resources; (2) they do not provide any form of information consolidation or analytics that are needed for assessing the risk to a given organization; (3) they do not provide any mechanism to assess what information is being gathered about the organization as a whole; and (4) they do not provide a means of discovering relationships and preferences that is language independent.

Other tools have also been developed to obscure the network layer connection path when accessing websites, such as Anonymizer. However, tools like Anonymizer, which only disassociate IP addresses from particular users, are unable to prevent a third party from receiving higher layer information (e.g., application or presentation layers). As such, the third party can still analyze users' behavior and then form user groups, realize intent, or infer the user's and/or organization's identity based on the analysis.

SUMMARY OF THE DISCLOSURE

To address the deficiencies of the existing tools, this disclosure provides illustrative embodiments of methods, systems, and computer readable media storing computer executable instructions for determining whether a third party observer could, if they were so inclined, determine that an organization has an intent with respect to a particular subject matter based on the organization's web usage information. Methods, systems, and computer readable media storing computer executable instructions are also disclosed for obscuring the existence of an intent of an organization with respect to some subject matter by obscuring the organization's targeted web activity among neutralizing web information, where neutralizing web information mimics a user's web behavior in a manner that is substantially unrelated to the organization's intent and would obscure the organization's actual intent when analyzed by a third party.

Herein, targeted web activity refers to an organization's web usage information that is associated with the organization's intent and neutralizing web information is information that would obscure the targeted web activity with respect to the organization's intent if the organization's web usage information were to be analyzed. Herein, an organization may refer to any suitable government entity, enterprise, company, and/or group of users. The intent of an organization includes a mere increased interest in subject matter or may be a more specific intent related to any business, research, and/or development in which the organization is involved or is investigating for possible involvement. For example, the organization might intend to participate or may be merely investigating the possibility of participating in a financial/business transaction (e.g., merger or acquisition), new product development, or some other activity that the organization would prefer to keep secret from competitors and/or the public at large. Regarding government entities, the intent of the organizations can include investigations regarding political strategies, terrorist organizations, other nations, or matters of national security.

In some embodiments, the systems for determining whether a third party observer could, if they were so inclined, determine that an organization has an intent with respect to a particular subject matter based on the organization's web usage information include metadata extracting circuitry. The metadata extracting circuitry, which may be positioned in the organization's network at a point where network communications are consolidated, collects data that is in transit between users on the organization's network and elements on the Internet. The metadata extracting circuitry extracts the metadata from the collected data and sends the extracted metadata to privacy analyzing circuitry. The privacy analyzing circuitry processes the extracted metadata to what information third party observers may have received from the organization's web activity. Based on the processed metadata, the privacy analyzing circuitry then determines whether third party observers may have received sufficient information to determine that the organization has an intent with respect to the particular subject matter based on the extracted metadata.

In some embodiments, the privacy analyzing circuitry maintains counters that are each associated with respective metadata. The counters are incremented substantially each time the associated metadata is received by the privacy analyzing circuitry. The metadata can include information related to HTTP cookies, HTML meta tags, URLs that are accessed, source IP addresses, destination IP addresses, source MAC addresses, and/or destination MAC addresses.

In some embodiments, what information the third party observer has acquired about the users in the organization's network is determined based on the extracted metadata. In some embodiments, whether the third party observer could determine the intent of the organization is determined based on the extracted metadata. In some embodiments, entropy graphs are used to make the determination on whether the third party observer has received sufficient information to determine the intent of the users in the organization's network. The entropy graphs may be based on the counters. The peaks of the entropy graph can indicate that the third party observer has received sufficient information to determine that the organization has an intent with respect to a particular subject matter. In some embodiments, distance metrics are used instead of, or in addition to, the entropy graphs to determine whether the third party observer has received sufficient information to determine that the organization has an intent with respect to a particular subject matter.

Additional aspects of the disclosure relate to methods and computer readable medium for determining whether a third party observer could, if they were so inclined, determine that an organization has an intent with respect to a particular subject matter based on the organization's web usage information.

In some embodiments, the system for obscuring the intent of an organization includes obfuscating circuitry that can generate neutralizing web information which, when output by the organization's network, will obscure the organization's targeted web activity among the neutralizing web information. For example, the neutralizing web information can include specific queries, links, and/or actions that mimics users' behavior, which the organization can take that would make the organization's targeted web activity less apparent to a third party observer who is analyzing the organization's aggregate web activity. In some embodiments, the neutralizing web information may make the organization's targeted web activity appear to relate to a broader or different subject matter than the organization's actual intent. For example, neutralizing web information used to obscure an interest in company B from company A's web activity may include web activity related to company B's competitors so that a third party observer analyzing company A's aggregate web activity would only be able to discern that company A is investigating company B's industry and not specifically company B.

In some embodiments, the obfuscating circuitry determines the neutralizing web information by reversing the process by which DAS determine similarities between users' behaviors. First, the obfuscating circuitry generates a similarity matrix that is representative of the similarity or dissimilarity between users in an organization, wherein the similarity matrix is generated based on the organization's web usage information. For example, the organization's similarity matrix includes similarity index values that are indicative of the similarity between users in the organization. Then, the obfuscating circuitry provides a desired similarity matrix that meets obfuscation constraints, wherein the obfuscation constraints may set, for example, a maximum similarity index value for the organization's similarity matrix between different users. For example, one possible manner to obscure the organization's intent would be to make it appear to a third party observer that all users in the organization are acting independently, and thus, their web activity is relatively dissimilar. A maximum similarity index value between different users may achieve this relatively dissimilar appearance.

The desired similarity matrix includes user similarity index values that would obscure whether an organization has an intent with respect to a particular subject matter when the similarity index values are analyzed by a third party observer. In some embodiments, the obfuscating circuitry provides a set of desired similarity matrices. In some embodiments, the set of desired similarity matrices are predetermined. In some embodiments, a subset of the set of desired similarity matrices are selected and/or generated to meet the particular obfuscation constraints that are based on the organization's current network usage. A distance matrix is generated based on the organization's similarity matrix and the desired similarity matrix. The distance matrix generally represents the distance the organization's similarity matrix is from the desired similarity matrix, and thus, the distance from a similarity matrix in which the obfuscation constraints are met. This distance matrix may be generated using any suitable distance metric.

Based on the distance matrix, the obfuscating circuitry selects a candidate action from a plurality of candidate actions. In some embodiments, the candidate action is selected based on a gradient descent calculation on the distance matrix. In some embodiments, the candidate action includes web behaviors that would make the organization's similarity matrix more similar the desired similarity matrix. For example, the candidate action can include instructions for creating neutralizing web activity by performing a particular behavior on a website. The obfuscating circuitry modifies the organization's similarity matrix based on the candidate action and then determines whether the modified organization's similarity matrix meets the obfuscation constraints.

In some embodiments, the obfuscating circuitry iterates the selection of the candidate action and modification of the organization's similarity matrix until the organization's similarity matrix meets the obfuscation constraints. In some embodiments, the obfuscating circuitry iterates the selection of the candidate action and modification of the organization's similarity matrix until the number of iterations has reaches a maximum number of iterations.

Once the candidate action(s) has been selected, the obfuscating circuitry can generate neutralizing web activity based on the instructions included in the candidate action(s). In some embodiments, the neutralizing web activity is generated with a spoofed address associated with a user in the organization so that the neutralizing web activity appears to be legitimate web activity to a third party observer.

Additional aspects of the disclosure relate to methods and computer readable medium for causing a computer device to carryout the functionality of the system described above for obscuring the intent of an organization by obscuring the organization's targeted web activity among neutralizing web information.

BRIEF DESCRIPTION OF THE DRAWINGS

The system and methods may be better understood from the following illustrative description with references to the following drawings in which.

DETAILED DESCRIPTION

To provide an overall understanding of the disclosed methods and systems, certain illustrative embodiments will now be described, including systems and methods for monitoring and mitigating information leaks from an organization's network. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The disclosed information leakage monitoring and mitigation systems focus on the inadvertent leakage of information that can occur through data mining by external sources. The disclosed systems permit an organization to develop an understanding of the concentration and type of data being gathered. With this information, the organization can develop informed policies and take specific actions to limit the undesired leakage of information and to avoid unnecessary blocking of information which can damage productivity and limit the access to information that is needed by modern organizations.

The disclosed information leakage monitoring and mitigation systems address this problem by applying network-based monitoring techniques that analyze the web usage of users on the organization's network, such as the use of Internet applications, in order to determine when these applications are using DAS, which DAS providers have insight into which applications, and what information is being collected by DAS providers from applications. Based on these determinations, the disclosed information leakage monitoring and mitigation systems generate warnings to indicate when a DAS provider has received sufficient web usage information to determine, if they were so inclined, that the organization has an intent with respect to a particular subject matter. The disclosed information leakage monitoring and mitigation systems may also attempt to prevent or mitigate these unintended disclosures, preferably in a manner that avoids unnecessarily blocking web access which can damage productivity and limit the access to information that is needed by modern organizations and without generating an overly excessive volume of network traffic.

Figure 1:
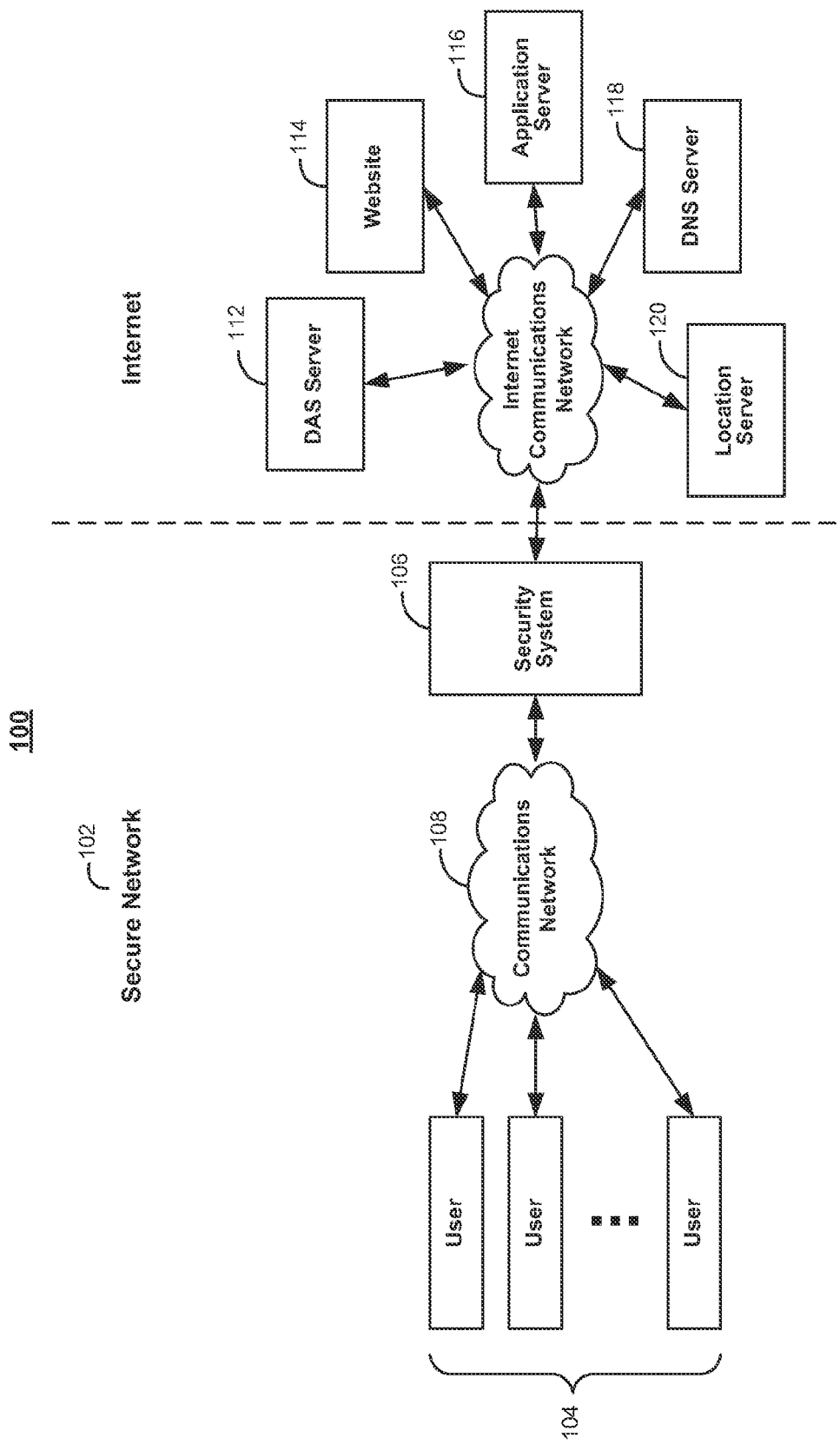
FIG. 1 is a block diagram of a network that includes a security system connected to the Internet, according to an illustrative embodiment.

FIG. 1 is a block diagram of network 100, which includes secure network 102 and the Internet. Secure network 102 includes users 104, security system 106, and communications network 108. As an illustrative embodiment, the Internet includes DAS server 112, website 114, application server 116, DNS server 118, and location server 120.

Secure network 102 is and/or includes any suitable network, for example, a personal area network, local area network, home area network, campus network, wide area network, global area network, organization private network, public switched telephone network, the Internet, and/or any other suitable type of network. Users 104 are users of secure network 102 and represent any suitable device in secure network 102, such as, a personal computer, mobile computing device, or a device connected into secure network 102 via virtual private network (VPN). Users 104 can communicate with any suitable element in secure network 102 and/or any suitable element in the Internet via communications network 108, which may be any suitable network or combination of networks.

Security system 106 is responsible for monitoring and mitigating potential information leaks. Security system 106 may be implemented in any suitable network element, for example, in a firewall, Internet gateway, and/or any other point where user data is consolidated. When placed in network elements, security system 106 can examine the traffic flowing across aggregation or trunking circuits to determine which DAS might be gathering information and the type of information the DAS could be gathering and possibly compiling about users 104 and/or the associated organization. For example, security system 106 can observe user application data that is in transit between users 104 and Internet-connected devices, such as, DAS server 112, website 114, application server 116, DNS server 118, location server 120, and other related network services. In addition, security system 106 can use network registries, network addresses, and domain management information to automatically identify the DAS resources that are being used to gather the information. In some embodiments, all or most of the network communications entering or leaving network 102 will pass through security system 106. For example, security system 106 may examine all outgoing network traffic to the Internet. In some embodiments, security system 106 is equipped with software and/or hardware for detecting and mitigating information leaks. Such embodiments are discussed below with regard to FIGS. 2-5.

DAS server 112 may be a typical DAS server that is generally configured to collect and analyze information about users or organizations. The types of information tracked by DAS server 112 include, for example, geolocation, dwell time on a particular web page, incoming and outgoing clicks (e.g., launch points), the type of computer used, the telecommunications provider used, as well as a number of other parameters. DAS server 112 may acquire the information about users and/or their respective organizations by aggregating the information collected from a number of websites and/or web applications with which the DAS operator has a relationship. For example, DAS server 112 may collect data about a user when the user visits website 114 and collect data about the same user when the user visits application server 116 if the operator of DAS server 112 has a business relationship with both website 114 and application server 116. If a number of users 104 have a lot of activity with relation to website 114, the operator of DAS server 112 might be able to aggregate users 104 web usage information and determine that users 104 have some sort of intent with respect to website 114 or the subject matter associated with website 114.

Website 114 may be any typical website that is accessible by users 104 over the Internet. Web application server 116 may be a typical web server that hosts any web-based application that is accessible by users 104 over the Internet. DNS server 118 may be a typical server that is generally responsible for providing mapping between IP addresses and hostnames. Location server 120 may be a typical server that provides location related services.

Figure 2:
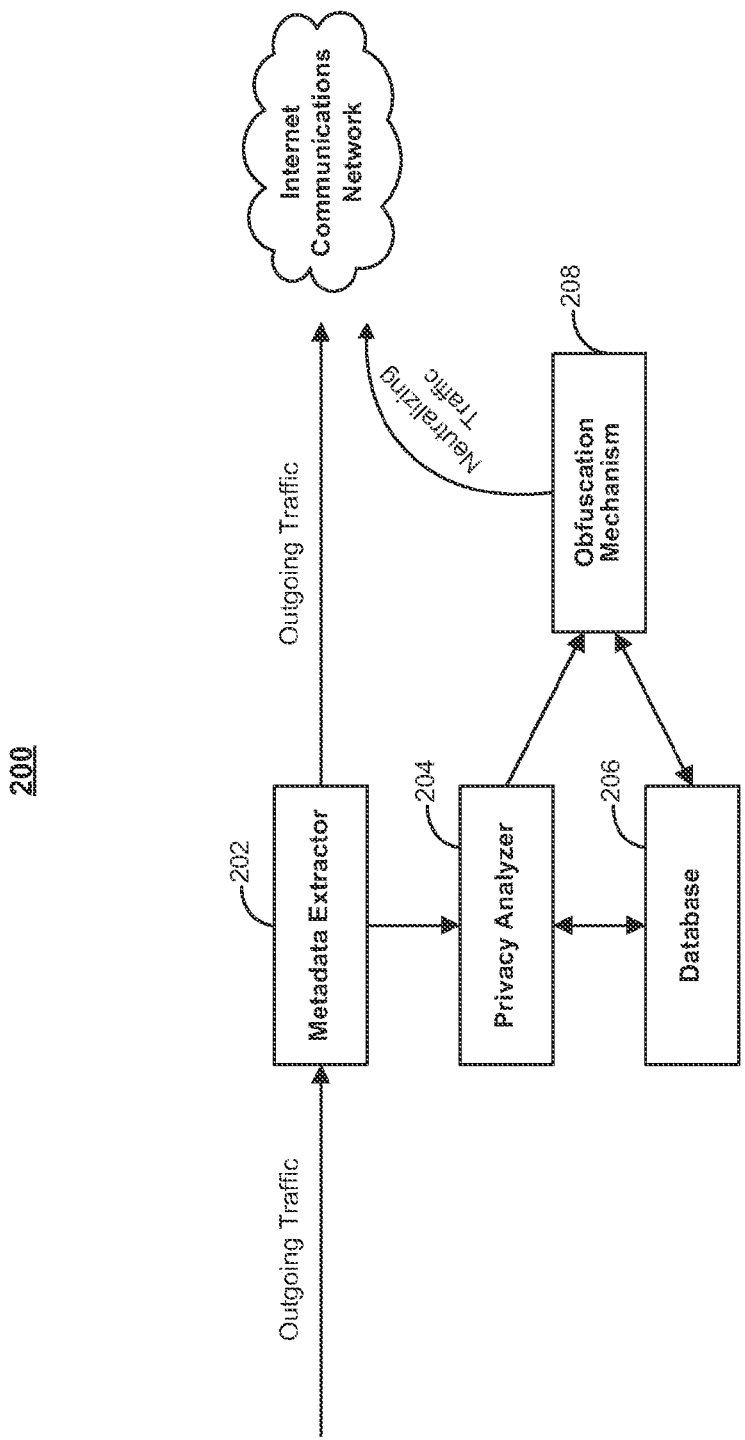
FIG. 2 is a block diagram of an information leakage monitoring and mitigation system, according to an illustrative embodiment.

FIG. 2 is a block diagram of information leakage monitoring and mitigation system 200. System 200 may be located within security system 106 of FIG. 1 and includes metadata extractor 202, privacy analyzer 204, database 206, and obfuscation mechanism 208.

Metadata extractor 202 is configured to scan at least a portion of a network's outgoing network traffic, for example, traffic exiting secure network 102 into the Internet of FIG. 1. In some embodiments, metadata extractor 202 scans all of the outgoing network traffic. Metadata extractor 202 can extract elements such as HTTP cookies, HTML meta tags, the times at which application transactions occur, URLs that are accessed, IP addresses, MAC addresses, and/or any other suitable network communication information. Information loss monitoring and mitigation system 200 can use the extracted metadata elements in several ways. For example, for known DAS or tracking services, system 200 can identify whether a DAS and/or tracking service has sufficient information to discern that an organization has an intent with respect to a particular subject matter, which users are being tracked by which DAS and/or tracking service, and what information the users are revealing to each DAS and/or tracking service. System 200 can also determine what information each DAS knows about the organization as a whole by aggregating the information disclosed by individual users. Such embodiments are discussed in greater detail below.

In some embodiments, metadata extractor 202 runs in parallel with other network processes and/or devices, such as a network router. In such an embodiment, both metadata extractor 202 and the network router will receive identical or substantially similar outgoing network traffic. Duplicating incoming network traffic and/or utilizing packet capturing techniques can allow information leakage monitoring and mitigation system 200 to perform its functions without increasing or substantially increasing the network's latency. For example, metadata extractor 202 can scan the incoming network communications while the network router forwards the identical incoming network communications to the appropriate device in the network. After extraction by metadata extractor 202, the metadata is passed to privacy analyzer 204.

Privacy analyzer 204 is configured to determine whether a third party entity has received enough information to discern whether an organization has an intent with respect to a particular subject matter. For example, privacy analyzer 204 may determine that a particular DAS might have monitored users 104 web activity across a number of websites, where the web activity was actually related to a target company for which users 104 are investigating for a possible acquisition. Privacy analyzer 204 may additionally determine that the DAS has received sufficient information such that, if the DAS was so inclined, the DAS would be able to discern that users 104 have some intent with regard to the target company. In some embodiments, privacy analyzer 204 may identify whether individual users are being tracked by a particular DAS or other tracking service. Additionally or alternatively, privacy analyzer 204 may determine what information a DAS or multiple DASs may know about the organization associated with secure network 102.

In order to determine whether information leaks may be occurring, privacy analyzer 204 may generate an entropy graph or multiple entropy graphs, such as entropy graph 300 of FIG. 3, which will be discussed in greater detail below. For example, when extracted metadata is received from metadata extractor 202, privacy analyzer 204 will increment a counter associated with the received metadata for use in an entropy graph, or alternatively, use the incremented counter and other counters to calculate an entropy value. For example, when organization users, such as users 104 of FIG. 1, visit a particular web server in a higher volume than other web servers, peaks in the entropy graphs associated with the particular web server will begin to form. As another example, the extracted metadata can include information regarding search terms used in queries performed by users 104. When users 104 have an intent with regard to a particular subject matter, they will likely perform an increased number of queries that include search terms related to the particular subject matter. As such, peaks in the entropy graphs associated with particular search terms and/or general search term subject matter that is related to the intent of users 104 may begin to form. These peaks can indicate that a third party may have received enough information to determine that users 104 have some intent with respect to the subject matter of the particular web server or search terms, respectively.

In some embodiments, the counter is associated with a specific domain, sub-domain, domain registry, web address, DAS, website, and/or any other suitable Internet attribute. As a specific example, privacy analyzer 204 might receive information from metadata extractor 202 that indicates that user A's device is sending information to DAS server 112. In response to receiving the information, privacy analyzer 204 will increment a counter associated with DAS server 112 in an entropy graph associated with user A. The incremented counter keeps track of the total number of communications from user A's device to DAS server 112. Additionally or alternatively, privacy analyzer 204 will increment a counter associated with DAS server 112 in an entropy graph associated with users 104 (e.g., all or substantially the users in a particular organization). This incremented counter keeps track of the total number of communications from users 104 to DAS server 112 (e.g., the organization aggregated communications to DAS server 112). The counters may be incremented by any suitable value, for example, by 1 for each outgoing communication associated with a particular domain that is received by privacy analyzer 204. In some embodiments, the counters may be incremented by a value less than or greater than 1 depending on the type of communication that is received. For example, DNS requests may increment a counter by a value smaller than 1, while a different type of web transaction may increment the counter by a value greater than 1.

In some embodiments, each counter in the entropy graph(s) is associated with specific details of the outgoing information in addition to, or alternative to, the association with a particular domain or address. For example, a counter associated with DAS server 112 may be additionally associated with a number of other counters that keep track of what type of information is being sent to DAS server 112. As a specific example, users 104 may conduct Internet searches for Company A, among other searches, using multiple search engines. Through a relationship between DAS server 112 and the Internet search engine entities, DAS server 112 will aggregate the information that users 104 are conducting searches about Company A. Privacy analyzer 204 will increment a counter that is associated with (1) searches related to Company A, and (2) DAS server 112 whenever an outgoing transmission destined for DAS server 112 is associated with Company A. In this manner, privacy analyzer 204 will be able to determine what information DAS server 112 may know about the web usage history of users 104.

In some embodiments, privacy analyzer 204 can identify new DAS servers or providers, as well as new techniques that a DAS provider is using to gain information about users 104. For example, if privacy analyzer 204 detects a large number of communications of a particular data type going to a previously unknown domain, privacy analyzer 204 may determine that the previously unknown domain is a new DAS server. As another example, the detection of new DAS servers, providers, or new tracking techniques may be determined based on correlations among different metadata elements. For example, all communications related to a DAS provider are usually directed to the same server, stored in the same field in a particular protocol, and remain constant for each user the DAS is tracking. As such, privacy analyzer 204 may decompose the communications of users 104 into data fields. If some data fields in each message remain constant for individual users, but are different when compared to the data fields of other users, privacy analyzer 204 may determine that the destination server associated with the decomposed communications is associated with a DAS.

In some embodiments, privacy analyzer 204 provides the counter, entropy, information about newly detected servers, provides, techniques, and/or any other suitable information to database 206. Database 206 may be any suitable database and may be local or remote to privacy analyzer 204. Database 206 may additionally, or alternatively, be distributed throughout secure network 102 and/or any other suitable network. In some embodiments, the information stored in database 206 is available online so that network operators, security analysts, and/or any other suitable person/entity may access the information and make determinations regarding information leakage risks to secure network 102.

In some embodiments, privacy analyzer 204 monitors the risk of information leakage by utilizing distance metrics in addition to, or alternative to, the aforementioned entropy/counter analysis. For example, privacy analyzer 204 may determine the distance between a domain and domain registry, address and DAS, a first DAS and a second DAS, websites to DASs, and/or any other suitable distance parameters. Here, the distance may relate to physical distance, network distance (e.g., number of hops), click-through distance (e.g., number of links/clicks required to get from one webpage to another), and/or any other suitable distance metric. For example, if a user navigates to a search engine, clicks a link associated with a DAS, and then goes back to the search engine, the distance is a value of 1. If the user navigates to other pages in between the search engine and the DAS and in between the DAS and the return to the search engine, the distance will be a value greater than 1. In some embodiments, the distance metrics measure distance values between values of an entropy graph and/or parameters of the entropy graph, such as entropy graph 300 of FIG. 3. The lower the distance value, the greater indication that a lot of a user's web activity is concentrated about a particular subject matter, for example, subject matter for which the users have an intent. In some embodiments, privacy analyzer 204 may keep track of the similarity of web usage behavior between users from the perspective of each DAS. Smaller distance values are assigned to users with more similar behaviors, and larger distance values are assigned to users with less similar behaviors. Accordingly, privacy analyzer 204 can determine that a DAS is more likely to determine that the organization has an intent with respect to a particular subject matter when the web usage behavior of the users is relatively similar, which privacy analyzer 204 can determine from relatively small distance values.

In some embodiments, when a particular counter, entropy value, and/or distance metric reaches a specified threshold, privacy analyzer 204 will determine that there is a risk that a third party entity has received sufficient information to determine that an organization has an intent with respect to a particular subject matter and send a notification to obfuscation mechanism 208. For example, when the counter associated with a particular DAS reaches the specified threshold value (e.g., some suitable real number), privacy analyzer 204 will determine that the DAS has gathered a significant amount of information about the web usage of users 104 which could lead to information leaks. In some embodiments, the threshold relates to a maximum difference between counters. For example, one counter value may be significantly larger than the average counter value. If the difference between the counter value and the average counter value exceeds a specified threshold value, privacy analyzer 204 will determine that there is a risk that a third party entity has received sufficient information to determine that an organization has an intent. In response to that determination, privacy analyzer 204 will send a suitable notification to obfuscation mechanism 208. In some embodiments, the notification includes information about the severity and/or certainty regarding the potential information leakage. In some embodiments, the notification additionally, or alternatively, includes information about which entity may be acquiring the information and/or what information is at risk of being lost. In some embodiments, the notification is an indicator that simply notifies obfuscation mechanism 208 that information leakage may be occurring without providing any further information.

Obfuscation mechanism 208 is generally configured to generate alarms and warning based on the data gathered by privacy analyzer 204 and/or any notifications that privacy analyzer 204 sends to obfuscation mechanism 208 when information leaks are detected or suspected. The alarms and warnings generated by obfuscation mechanism 208 can be sent to other security or management systems or can be used in a standalone function.

In some embodiments, obfuscation mechanism 208 will take other actions to mitigate the risk of information leaks in addition to, or alternative to, the alarm and warning generation. For example, obfuscation mechanism 208 may generate neutralizing web traffic based on recommend behaviors from predetermined privacy preserving templates that, when implemented, would obscure the targeted web activity of users 104 with neutralizing web information. For example, the privacy preserving templates may provide suggestions of web browsing and/or network behavior modification based on the specific threats and/or network usage patterns identified by privacy analyzer 204 to neutralize the risk of information leakage. The implementation of a privacy preserving template may occur automatically in response to a notification from privacy analyzer 204 that indicates that there is a risk of information leakage. The privacy preserving templates may be stored in database 206.

In some embodiments, obfuscation mechanism 208 can determine the composition of the neutralizing web traffic for obscuring targeted web activity based on the specific threats and/or network usage patterns identified by privacy analyzer 204 in real-time. In some embodiments, the properties of the real-time generated neutralizing web traffic are substantially similar to the neutralizing web traffic generated from the predetermined privacy preserving templates, except that the real-time neutralizing web traffic is generated automatically in real-time. Third party observers, such as a DAS, generally use algorithms that determine the similarity of users based on their respective web activity. These similarity analysis algorithms can be reversed to derive the neutralizing web traffic that will make the users appear less similar. Such embodiments are discussed in further detail below with regard to FIG. 5.

Information leakage monitoring and mitigation system 200 may be implemented using any suitable combination of hardware and/or software. For example, the elements shown in FIG. 2 may be implemented using one or more PLD, FPGA, microcontroller, ASIC, other firmware, or any suitable combination thereof. As a further example, system 200 may utilize separate devices and/or chipsets for the collection of user application data, extraction of metadata by metadata extractor 202 and the analysis of the metadata by privacy analyzer 204. It should be noted that the elements shown in FIG. 2 may be removed, rearranged, and/or combined in any suitable fashion without departing from the disclosure. For example, obfuscation mechanism 208 may be removed such that system 200 only provides information leakage monitoring capabilities without information leakage mitigation capabilities. As a further example, portions of obfuscation mechanism 208 may be combined such that privacy analyzer 204 generates warnings and alarms when a risk of information leakage is detected.

Figure 3:
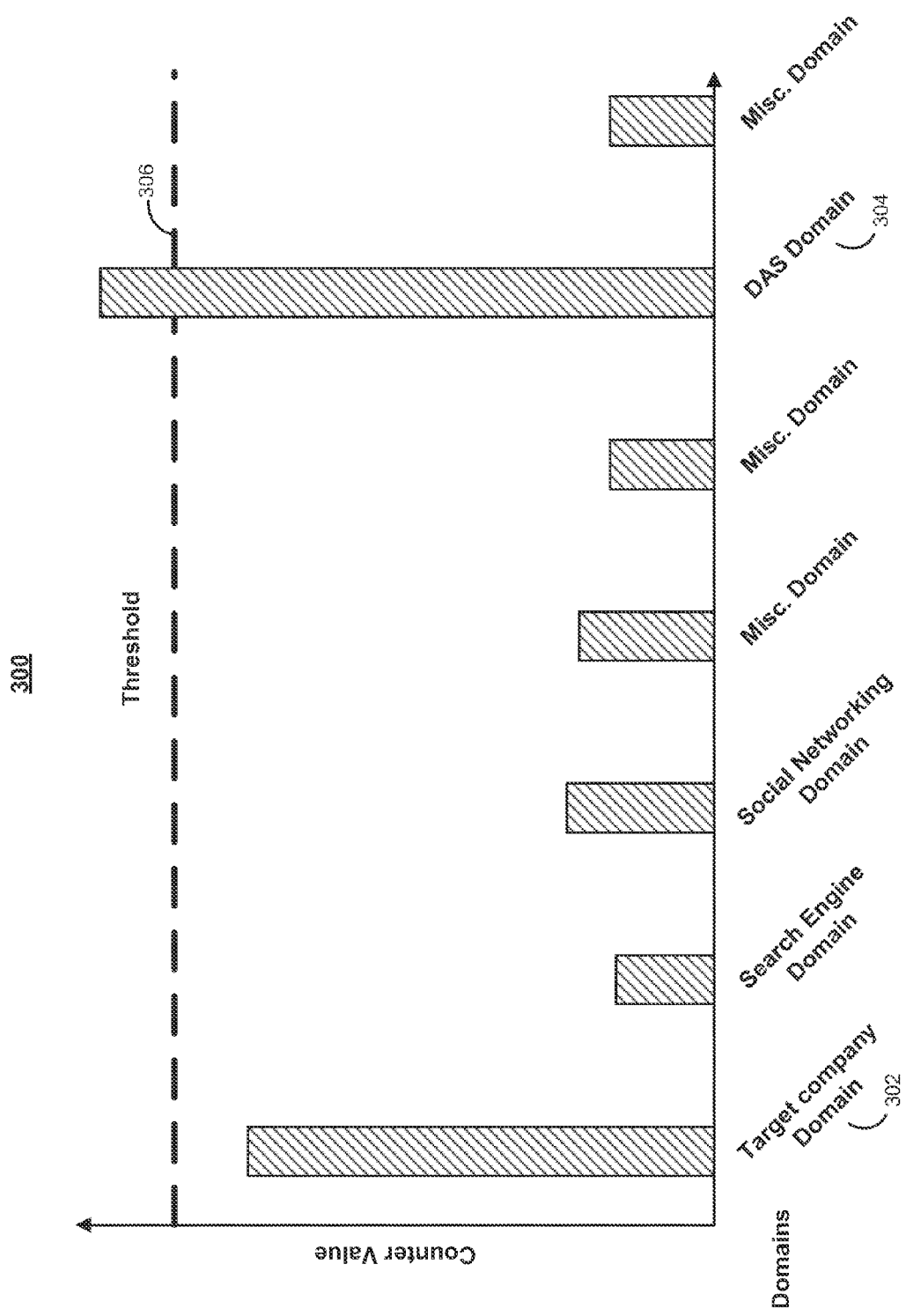
FIG. 3 is an illustrative entropy graph, according to an illustrative embodiment.

FIG. 3 depicts an illustrative entropy graph 300 which is substantially similar to an embodiment of the entropy graph discussed above with regard to privacy analyzer 204 of FIG. 2. Entropy graph 300 includes counter values on the y-axis and a number of different domains on the x-axis, however, any suitable information may be on the x-axis. For example, any of the types of metadata extracted by metadata extractor 202 may be used for the x-axis. For illustrative purposes, entropy graph 300 is associated with an organization, however, graph 300 may be associated with a particular user. Target company domain 302 is one domain entry on the x-axis of graph 300. For example, the target company is a company that the organization is investigating as a target for a possible merger. As illustrated by graph 300, target company domain is associated with a relatively high counter value. This can be due to many users in the organization's network accessing target company domain 302 to conduct their diligence investigation. As further illustrated by graph 300, DAS domain 304 also has a relatively high counter value. This may be because the DAS associated with DAS domain 304 is actively tracking the organization's web activities and/or metadata extractor 202 has encountered a relatively large number of communications associated with DAS domain 304. In this illustration, DAS domain 304's counter value has crossed threshold 306. Threshold 306 may be substantially similar to the thresholds discussed above with regard to privacy analyzer 204. For example, threshold 306 may refer to the maximum difference between one counter and the average counter value. Because DAS domain 304's counter value is above threshold 306, privacy analyzer 204 will issue a notification to obfuscation mechanism 208 that indicates that the DAS associated with DAS domain 304 has acquired a significant amount of the organization's aggregate web usage; which in turn, may allow the DAS to determine whether the organization has an intent with regard to the target company associated with target company domain 302. The notification may also indicate that the DAS associated with DAS domain 304 might be able to determine that there has been a lot of web activity within the organization regarding the target company based on the relatively high counter value associated with target company domain 302, which thus indicates that the secrecy of the possible merger could be jeopardized. As noted above, in some embodiments, obfuscation mechanism 208 will initiate information leakage mitigation techniques upon receiving the indication from privacy analyzer 204.

Figure 4:
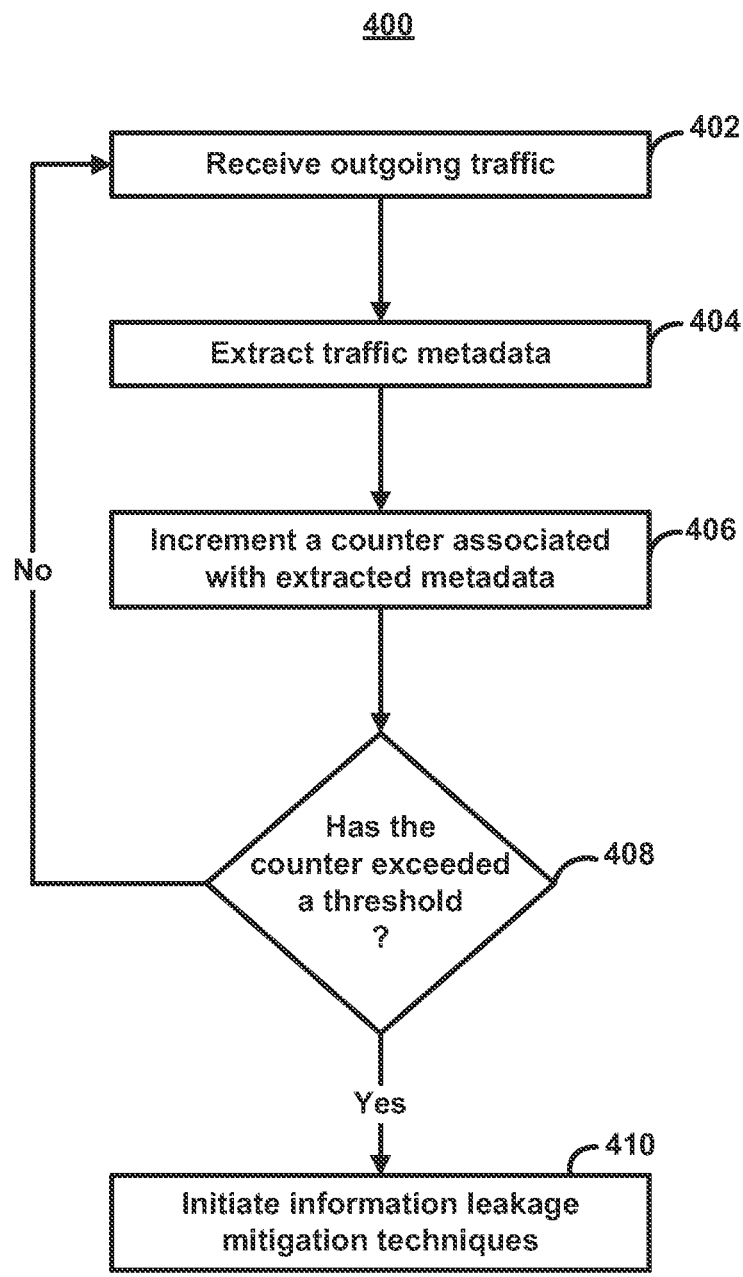
FIG. 4 is a flow chart of a method for monitoring information leaks, according to an illustrative embodiment.

FIG. 4 shows illustrative process 400 for monitoring information leaks. At step 402, outgoing traffic is received by, for example, information leakage monitoring and mitigation system 200 of FIG. 2. The outgoing traffic may be traffic that originated in secure network 102 of FIG. 1 which is bound for the Internet. At step 404, metadata is extracted from the outgoing traffic received at step 402. The metadata extraction may be performed by metadata extractor 202 of FIG. 2. As step 406, a counter associated with the extracted metadata is incremented. The counter may be used to update an entropy graph and/or an entropy value. As noted above with regard to FIG. 2, the counter may be associated with any suitable metadata that allows the system to monitor for possible information leaks. In some embodiments, the counter information may be stored in a database, such as database 206 of FIG. 2.

At step 408, it is determined whether the counter incremented at step 406 has exceeded a threshold, such as threshold 306 of FIG. 3. If the counter has not exceeded the threshold, process 400 proceeds back to step 402 to receive more outgoing traffic. If the counter has exceeded the threshold, process 400 proceeds to step 410. At step 410, information leakage mitigation techniques are initiated, for example, the information leakage mitigation techniques discussed above with regard to obfuscation mechanism 208 of FIG. 2.

In practice one or more steps shown in process 400 may be combined with other steps, performed in any suitable order, performed in parallel (e.g., simultaneously or substantially simultaneously), or removed. For example, in some embodiments, the information leakage monitoring and mitigation system 200 will continue to receive outgoing traffic at step 402 while simultaneously performing information leakage mitigation techniques at step 410. Process 400 may be implemented user any suitable combination of hardware and/or software in any suitable fashion.

Figure 5:
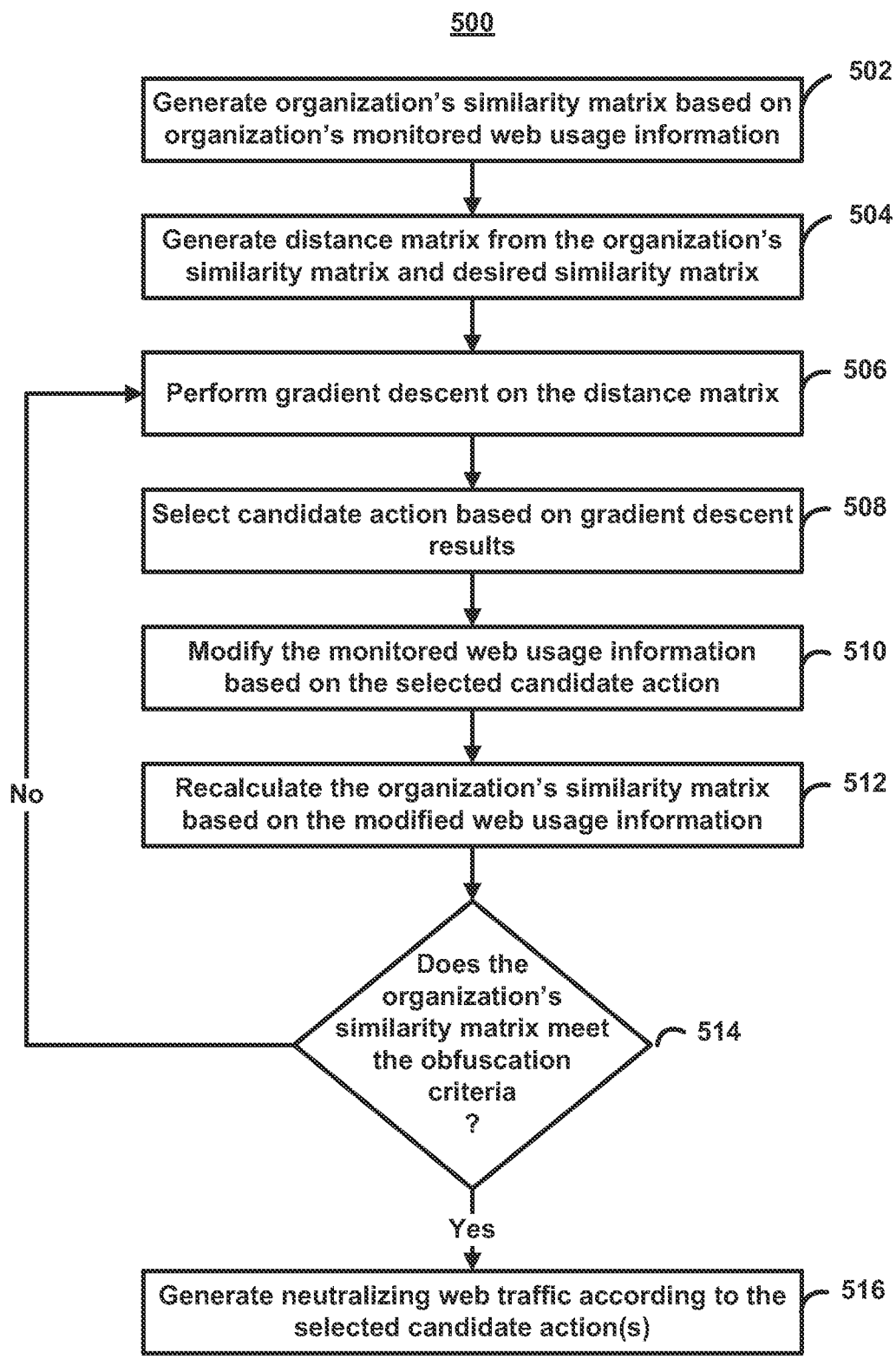
FIG. 5 is a flow chart of a method for mitigating information leaks, according to an illustrative embodiment.

FIG. 5 shows illustrative process 500 for mitigating information leaks which may be performed using, for example, obfuscation mechanism 208 of FIG. 2. As noted above with regard to FIG. 2, third party observers, such as a DAS, generally use algorithms that determine the similarity of users based on their respective web activity. These similarity analysis algorithms can be reversed to derive web behavior (e.g., neutralizing web information) that will make the users appear less similar. By reversing the similarity analysis algorithms, obfuscation mechanism 208 can determine the substantially most efficient neutralizing web activity that would obscure an organization's targeted web activity, and thus, the organization can obscure its targeted web activity using less data and bandwidth than would otherwise be possible (e.g., by using random web information).

To derive the neutralizing web information, process 500 begins at step 502 to generate a similarity matrix that is representative of the similarity between an organization's users. The organization's similarity matrix can be generated based on monitored web traffic, such as the traffic monitored by privacy analyzer 204. This similarity matrix is an estimate of a similarity matrix that may be derived by a third party observer, such as a DAS. The similarity matrix is generally a matrix that includes a similarity index value at each coordinate that indicates how similar one user is to the other, where a 0 value indicates completely dissimilar and a 1 value indicates completely identical. For example, a value of 0.7 at coordinate 1, 150 indicates that users 1 and 150 are about 70% similar. As a further example, a value of 0.15 at coordinate 2, 30 indicates that users 2 and 30 are about 15% similar. In some embodiments, the similarity matrix includes data from exemplary, and/or model users, where the exemplary and model users may be associated with neutral web activity (e.g., web activity that is not directly related to the intent of the organization). In some embodiments, the organization's similarity matrix may be based at least in part on the users' search behavior, click paths, subscriptions, and relationship tags (e.g., friends or subscriptions in social networking websites). Also, website dwell time, user provided connections, such as, location, age, income, and payment methods as well as common search history and/or web surfing patterns may be used. It should be noted that any suitable similarity algorithm may be utilized without departing from the scope of this disclosure.

After generating the organization's similarity matrix, obfuscation mechanism may compare the similarity matrix to a set of obfuscation constraints to determine whether the similarity matrix meets the constraints and/or whether it will be possible to modify the similarity matrix to meet the constraints. For example, one obfuscation constraint may be a maximum similarity index value limit between different users. As another example, one obfuscation constraint may be that the users should appear to be more similar to one of the exemplary users whose web activity is unrelated or broader than the organization's web activity that is associated with the organization's intent. For example, most of the organization's web activity may be centered around company A, but an exemplary user's web activity may be centered around company B. As such, if the organization's web activity were changed to be more similar to the exemplary user, a DAS would have trouble determining that the organization has some intent with regard to company A and instead might discern that the organization has some intent with regard to company B. In some embodiments, the obfuscation constraints are predetermined. In some embodiments, the obfuscation constraints are determined automatically by obfuscation mechanism 208 after receiving the notification from privacy analyzer 204 and determining the makeup of the organization's similarity matrix. For example, privacy analyzer 204 might indicate that the organization's web usage is centered around a particular website. Obfuscation mechanism 208 may then determine obfuscation constraints that relate to web usage centered around a different website or an increased entropy of the aggregate organization's web usage.

If the organization's similarity matrix does not meet the obfuscation constraints, obfuscation mechanism 208 provides a group of desired similarity matrices that do meet the constraints. These desired similarity matrices may be predetermined and stored in, for example, database 206. In some embodiments, the desired similarity matrices are derived by obfuscation mechanism 208 based on the obfuscation constraints. As an example, a desired similarity matrix can be an identity matrix, which represents that every user is only similar to themselves and has no similarity to any other user. Another desired similarity matrix may be a matrix where the organization's users are most similar to a neutral user whose web activity is centered around neutral behavior. In some embodiments, the desired similarity matrices represent valid behavioral states. For example, an identity similarity matrix may not be a plausible state of an organization's web activity because some users will always be at least a little similar to each other. Additionally, or alternatively, the desired similarity matrices may be close to the organization's similarity matrix. For example, a relatively small number of neutralizing actions would be necessary to move the organization's similarity matrix to the desired similarity matrix. In some embodiments, the desired similarity matrices are within the same ordering region as the organization's similarity matrix. For example, the organization's similarity matrix may map to a ranking vector (e.g., a vector that ranks the users in the similarity matrix) whose components are ordered in a particular manner. The desired similarity matrices would also map to ranking vectors that are ordered in the same manner. In some embodiments, the ranking vectors are the eigenvectors of their respective similarity matrices. In some embodiments, the ranking vectors are the eigenvectors of their respective similarity matrices that are associated with their respective largest eigenvalues.

Once the desired similarity matrices are determined, process 500 proceeds to step 504 where distance matrices are generated that represent the distance between the organization's similarity matrix and the respective desired similarity matrices. The distance matrices may be determined from the difference in similarity index values, the sum of squares, or any other suitable distance metric. In some embodiments, distance matrices are determined for each of the desired similarity matrices. These distance matrices provide information as to how far the organization's similarity matrix is from a desired similarity matrix.

At step 506, a gradient descent calculation is performed on the distance matrices to determine on which user in the organization's similarity matrix a neutralizing action will have the greatest neutralizing effect. For example, the gradient descent can determine the steepest descent from the organization's similarity matrix to a desired similarity matrix, where the steepest descent may be associated with the web activities of a particular user. In some embodiments, the gradient descent is performed for each of the different distance matrices that are derived from the different desired similarity matrices. In some embodiments, the gradient descent for each of the distance matrices is performed in parallel.

After performing the gradient descent, process 500 proceeds to step 508 where a candidate action is selected from a set of candidate actions. The candidate actions may identify specific queries, links, and/or actions individuals and organizations could take to neutralize their prior web searches and activity. For example, a candidate action may contain information on specific searches to execute, configurations, certain web pages to visit, or other web activities to perform. In some embodiments, the candidate actions may be associated with a behavior and/or a website. A user's targeted web activity can be neutralized by performing a candidate action behavior on the associated website, such that when the behavior is performed on the associated website by a particular user, the action may make the user more similar to a neutral user. For example, obfuscation mechanism 208 may emulate a candidate action such that it appears that a user(s) associated with the steepest descent, as determined by the gradient descent, performed the candidate action. In some embodiments, obfuscation mechanism 208 may have a number of candidate actions available to use as neutralizing web activity. The particular candidate action may be selected at random or according to a priority level of actions to select. For example, each candidate action may be associated with a priority level that indicates how likely the candidate action is to modify an organization's similarity matrix to a desired similarity matrix. Obfuscation mechanism 208 may store the selected candidate actions in database 206 after selecting the respective candidate action. In some embodiments, obfuscation mechanism 208 associates the selected candidate actions with the respective distance matrix (e.g., the distance matrices associated with the respective desired similarity matrices) so that obfuscation mechanism 208 can distinguish which candidate action was selected for which desired similarity matrix.

After selecting the candidate action, process 500 proceeds to step 510 to modify the monitored web traffic based on the selected candidate action. For example, obfuscation mechanism 208 may modify the data monitored by privacy analyzer 204. In some embodiments, obfuscation mechanism 208 maintains multiple copies of the modified monitored web traffic, where each copy is associated with a different gradient descent calculation and/or different desired similarity matrix. Once the web traffic is modified according to the selected candidate action, process 500 proceeds to step 512 to recalculate the organization's similarity matrix based on the modified traffic. In some embodiments, obfuscation mechanism 208 may maintain multiple versions of recalculated organization similarity matrices, where each version is associated with a different gradient descent calculation and/or different desired similarity matrix.

After recalculating the organization's similarity matrix, process 500 proceeds to step 514 where it is determined whether the recalculated organization similarity matrix meets the obfuscation constraints discussed above with regard to step 504. If the recalculated organization similarity matrix does not meet the constraints, process 500 iterates back to step 506 to perform a new gradient descent on the recalculated organization similarity matrix and determine additional candidate actions that may be taken in an attempt to obscure the organization's targeted web activity. In some embodiments, process 500 will not iterate back to step 506 if process 500 has already iterated a maximum number of iterations, it is determined that the organization's similarity matrix will not meet the obfuscation constraints, and/or a maximum number of iterations have been performed where the candidate actions chosen made only a marginal difference in the organization's similarity matrix. In such embodiments, process 500 may simply end without determining effective neutralizing web information or may randomly restart. For example, if the neutralizing effect is small for successive iterations, process 500 may randomly restart to avoid a local minima in the gradient descent. In some embodiments, process 500 may randomly restart with an organization's similarity matrix that includes some or all of the web traffic modifications made before the restart.

If a recalculated organization similarity matrix does meet the constraints, process 500 proceeds to step 516 where web traffic is generated. For example, obfuscation mechanism 208 can generate web traffic according to the candidate actions that were used to modify the recalculated organization similarity matrix. As noted above, the candidate actions may be stored in database 206 and associated with the respective modified similarity matrix. Obfuscation mechanism 208 can generate the web traffic with spoofed IP or MAC addresses of users in the organization or fictitious users.

In practice one or more steps shown in process 500 may be combined with other steps, performed in any suitable order, performed in parallel (e.g., simultaneously or substantially simultaneously), or removed. In some embodiments, process 500 may be performed in parallel for different desired similarity matrices and/or different set of candidate actions. Process 500 may be implemented user any suitable combination of hardware and/or software in any suitable fashion.

The invention may be embodied in other specific forms without departing from the spirit or essential characteristics thereof. For example, the processes disclosed herein for monitoring and mitigating information leaks may be equally applied to networks and/or systems of any suitable size and configured in any suitable manner. As another example, in the embodiments described above, any reference to web traffic is equally applicable to web usage information, web activity, and/or web information and vice versa. The foregoing embodiments are therefore to be considered in all respects illustrative, rather than limiting of the invention.

What is claimed is:
1. A method for obscuring an existence of an intent of an organization with respect to subject matter, the method comprising:
  monitoring and collecting data in transit between web users of an organization and internet connected elements;
  extracting and processing metadata from the collected data to determine web behavior of the web users;
  storing, in a database, the web behavior of the web users;
  retrieving, using processing circuitry, from the database, the web behavior of the web users;
  comparing the web behavior of the web users to determine a similarity between the web behavior of the web users;
  generating, based on the comparison, an organization's similarity matrix indicating the similarity between the web behavior of the web users;
  retrieving, from storage, a desired similarity matrix indicating web behavior for the web users that meets an obfuscation constraint, wherein the obfuscation constraint indicates a desired level of obfuscation of the web behavior of the web users;
  generating, using the processing circuitry, a distance matrix indicating a distance between the organization's similarity matrix and the desired similarity matrix;
  selecting a candidate action from a plurality of candidate actions, the selected candidate action including a web behavior such that executing the web behavior would reduce the distance between the organization's similarity matrix and the desired similarity matrix;

modifying the organization's similarity matrix based on the candidate action;

recalculating the distance matrix using the modified organization's similarity matrix and the desired similarity matrix;

determining using the recalculated distance matrix, whether the candidate action reduced the distance between the organization's similarity matrix and the desired similarity matrix;

determining whether the modified organization's similarity matrix meets the obfuscation constraint based on the reduction in distance; and executing the web behavior included in the candidate action to obfuscate the web behavior of the web users.

2. The method of claim 1, further comprising iterating the-selecting the candidate action and modifying the organization's similarity matrix until the modified organization's similarity matrix meets the obfuscation constraint.

3. The method of claim 1, further comprising iterating the selecting the candidate action and modifying the organization's similarity matrix until the number of iterations reaches a maximum number of iterations.

4. The method of claim 1, wherein the candidate action is selected based on a gradient descent calculation on the distance matrix.

5. The method of claim 1, further comprising:
generating neutralizing web activity based on the selected candidate action.

6. The method of claim 1, wherein the candidate action includes a website, and wherein the web behavior comprises a web behavior to execute on the website.

7. The method of claim 1, wherein the web behavior is executed with a spoofed address associated with a user in the organization.

8. The method of claim 1, wherein the obfuscation constraint sets a maximum similarity index value for the organization's similarity matrix.

9. A system for obscuring an existence of an intent of an organization with respect to subject matter, the system comprising:
a memory;
processing circuitry coupled to the memory configured to:
monitor and collect data in transit between web users of an organization and internet connected elements;
extract and process metadata from the collected data to determine web behavior of the web users;
store, in a database, the web behavior of the web users;
obfuscating circuitry configured to:
retrieve from the database, the web behavior of the web users;
compare the web behavior of the web users to determine a similarity between the web behavior of the web users;
generate, based on the comparison, an organization's similarity matrix indicating the similarity between the web behavior of the web users;
retrieve, from storage, a desired similarity matrix indicating web behavior for the web users that meets an obfuscation constraint, wherein the obfuscation constraint indicates a desired level of obfuscation of the web behavior of the web users;
generate a distance matrix indicating a distance between the organization's similarity matrix and the desired similarity matrix;

select a candidate action from a plurality of candidate actions, the selected candidate action including a web behavior such that executing the web behavior would reduce the distance between the organization's similarity matrix and the desired similarity matrix;

modify the organization's similarity matrix based on the candidate action;

recalculate the distance matrix using the modified organization's similarity matrix and the desired similarity matrix;

determine using the recalculated distance matrix, whether the candidate action reduced the distance between the organization's similarity matrix and the desired similarity matrix;

determine whether the modified organization's similarity matrix meets the obfuscation constraint based on the reduction in distance; and execute the web behavior included in the candidate action to obfuscate the web behavior of the web users.

10. The system of claim 9, wherein the obfuscating circuitry is further configured to iterate the selecting the candidate action and modifying the organization's similarity matrix until the modified organization's similarity matrix meets the obfuscation constraint.

11. The system of claim 9, wherein the obfuscating circuitry is further configured to iterate the selecting the candidate action and modifying the organization's similarity matrix until the number of iterations reaches a maximum number of iterations.

12. The system of claim 9, wherein the candidate action is selected based on a gradient descent calculation on the distance matrix.

13. The system of claim 9, wherein the obfuscating circuitry is further configured to generate neutralizing web activity based on the selected candidate action.

14. The system of claim 9, wherein the candidate action includes a website, and wherein the web behavior comprises a web behavior to execute on the website.

15. The system of claim 9, wherein the web behavior is executed with a spoofed address associated with a user in the organization.

16. The system of claim 9, wherein the obfuscation constraint sets a maximum similarity index value for the organization's similarity matrix.

17. A nontransitory computer readable medium storing computer executable instructions, which, when executed by a processor, cause the processor to perform a method for obscuring an existence of an intent of an organization with respect to subject matter, the computer readable medium comprising:
instructions for monitoring and collecting data in transit between web users of an organization and internet connected elements;
instructions for extracting and processing metadata from the collected data to determine web behavior of the web users;
instructions for storing, in a database, the web behavior of the web users;
instructions for retrieving, the processor, from the database, the web behavior of the web users;
instructions for comparing the web behavior of the web users to determine a similarity between the web behavior of the web users;
instructions for generating, based on the comparison, an organization's similarity matrix indicating the similarity between the web behavior of the web users;

instructions for retrieving, from storage, a desired similarity matrix indicating web behavior for the web users that meets an obfuscation constraint, wherein the obfuscation constraint indicates a desired level of obfuscation of the web behavior of the web users;

instructions for generating, using the processor, a distance matrix indicating a distance between the organization's similarity matrix and the desired similarity matrix;

instructions for selecting a candidate action from a plurality of candidate actions, the selected candidate action including a web behavior such that executing the web behavior would reduce the distance between the organization's similarity matrix and the desired similarity matrix;

instructions for modifying the organization's similarity matrix based on the candidate action;

instructions for recalculating the distance matrix using the modified organization's similarity matrix and the desired similarity matrix;

instructions for determining using the recalculated distance matrix, whether the candidate action reduced the distance between the organization's similarity matrix and the desired similarity matrix;

instructions for determining whether the modified organization's similarity matrix meets the obfuscation constraint based on the reduction in distance; and instructions for executing the web behavior included in the candidate action to obfuscate the web behavior of the web users.

* * * * *